US009818360B2

(12) United States Patent
Zuo et al.

(10) Patent No.: US 9,818,360 B2
(45) Date of Patent: Nov. 14, 2017

(54) LIQUID CRYSTAL DISPLAY AND CONTROL METHOD FOR THE SAME

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Qingcheng Zuo, Guangdong (CN); Gonghua Zou, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 129 days.

(21) Appl. No.: 14/889,917

(22) PCT Filed: Aug. 25, 2015

(86) PCT No.: PCT/CN2015/088027
§ 371 (c)(1),
(2) Date: Nov. 9, 2015

(87) PCT Pub. No.: WO2017/024622
PCT Pub. Date: Feb. 16, 2017

(65) Prior Publication Data
US 2017/0162156 A1 Jun. 8, 2017

(30) Foreign Application Priority Data
Aug. 7, 2015 (CN) .......................... 2015 1 0483710

(51) Int. Cl.
G09G 3/36 (2006.01)
G02F 1/1362 (2006.01)
(Continued)

(52) U.S. Cl.
CPC ......... *G09G 3/3677* (2013.01); *G02F 1/1368* (2013.01); *G02F 1/13454* (2013.01);
(Continued)

(58) Field of Classification Search
CPC ......... G09G 2330/02; G09G 2330/021; G09G 2330/022; G09G 2330/023;
(Continued)

(56) References Cited

U.S. PATENT DOCUMENTS 5,400,050 A 3/1995 Matsumoto et al.
2002/0126107 A1* 9/2002 Inoue .................... G09G 3/367
345/204

(Continued)

FOREIGN PATENT DOCUMENTS

CN 101609233 A 12/2009
CN 101937655 A 1/2011
(Continued)

Primary Examiner — Grant Sitta
(74) Attorney, Agent, or Firm — Andrew C. Cheng

(57) ABSTRACT

An LCD and a control method for the same are disclosed. The LCD includes a first frequency division unit for receiving a first control signal, performing a frequency division to the first control signal to obtain a first clock signal; a second frequency division unit for receiving a second control signal, performing a frequency division to the second control signal to obtain a second clock signal; a GOA unit for generating a scanning signal according to the first and the second clock signal; and a control unit for receiving the first and the second control signal, and when the scanning signal is effective, controlling a first pixel and a second pixel to be charged in a time-division manner according to the first and the second control signal. Accordingly, reducing the number of inputted signals, the time for adjusting timing sequence of the inputted signals and improving the production efficiency.

10 Claims, 3 Drawing Sheets

(51) Int. Cl.
   *G02F 1/1345* (2006.01)
   *G02F 1/1368* (2006.01)

(52) U.S. Cl.
   CPC ..... *G02F 1/136286* (2013.01); *G09G 3/3688* (2013.01); *G09G 2300/0408* (2013.01); *G09G 2310/0251* (2013.01); *G09G 2310/08* (2013.01)

(58) Field of Classification Search
   CPC ..... G09G 2330/024; G09G 2300/0434; G09G 2300/0439; G09G 2300/0443; G09G 2300/0447; G09G 2300/0452; G09G 2300/0456; G09G 2300/046; G09G 2300/0465; G09G 2300/0469; G09G 2300/0473; G09G 2300/0478; G09G 2300/0482
   USPC .................................... 345/212, 87
   See application file for complete search history.

(56) References Cited

U.S. PATENT DOCUMENTS

| | | | |
|---|---|---|---|
| 2003/0052873 A1* | 3/2003 | Ueda | G09G 3/2092 345/211 |
| 2007/0040450 A1* | 2/2007 | Chung | G09G 3/3225 307/109 |
| 2007/0075959 A1 | 4/2007 | Tobita | |
| 2007/0139339 A1 | 6/2007 | Kim et al. | |
| 2007/0200609 A1* | 8/2007 | Kang | G01R 31/31727 327/296 |
| 2008/0316159 A1* | 12/2008 | Qi | G09G 3/3677 345/92 |
| 2009/0174441 A1* | 7/2009 | Gebara | H02M 3/073 327/115 |
| 2010/0134396 A1* | 6/2010 | Umezaki | G09G 3/3413 345/92 |
| 2010/0245333 A1* | 9/2010 | Hsu | G09G 3/3648 345/213 |
| 2012/0133628 A1 | 5/2012 | Kim et al. | |
| 2013/0234763 A1* | 9/2013 | Gomm | H03K 21/38 327/118 |
| 2015/0154927 A1* | 6/2015 | Li | G09G 3/3677 345/214 |
| 2015/0221265 A1* | 8/2015 | Huang | G09G 3/3614 345/690 |
| 2016/0189587 A1 | 6/2016 | Zuo et al. | |
| 2016/0189588 A1 | 6/2016 | Zuo et al. | |
| 2016/0253951 A1* | 9/2016 | Devegowda | G09G 3/32 |

FOREIGN PATENT DOCUMENTS

| | | |
|---|---|---|
| CN | 202996250 U | 6/2013 |
| CN | 103700354 A | 4/2014 |
| CN | 104485080 A | 4/2015 |

* cited by examiner

LIQUID CRYSTAL DISPLAY AND CONTROL METHOD FOR THE SAME

BACKGROUND OF THE INVENTION

1. Field of the Invention

The present invention relates to the liquid crystal field, and more particularly to a liquid crystal display and a control method for the same.

2. Description of Related Art

Along with the development of the liquid crystal display (LCD), people demand a higher resolution for the LCD. Because the resolution is increased, the number of the data lines required for performing an output control is more and more. In order to reduce the number of the data lines of an LCD chip, a multiplexer (MUX) switching method is utilized to charge multiple sub-pixels having different colors using a same data line In a conventional 1:2 MUX mode liquid crystal display, two different control signals MUX_1 and MUX_2 are required to control the switching of data lines. At the same time, two different clock signals CLK_1 and CLK_2 are required to control the outputting of scanning lines. In order to make the liquid crystal display to be displayed normally, each of the control signals MUX_1 and MUX_2 has to be maintained in a fixed frequency. Besides, the control signals MUX_1 and MUX_2 have to be maintained with a certain relationship in a turning-on frequency and a sequence with respect to the scanning lines controlled by the clock signals CLK_1 and CLK_2.

Because in the conventional art, the control signal MUX_1, the control signal MUX_2, the clock signal CLK_1 and the lock signal CLK_2 are all input signals, and using a separate and independent controlling method to realize. In order to ensure a normal display of the LCD, in a real manufacturing process, a lot of time is spend to adjust a relative matching relationship of a timing sequence of the four inputted signals, which is harmful to a high efficiency production of the LCD.

SUMMARY OF THE INVENTION

The main technology problem solved by the present invention is to provide an LCD and a control method for the same, which can reduce the number of inputted signals, the time for adjusting a timing sequence of the inputted signals and improve the production efficiency.

In order to solve the above technology problem, a technology solution adopted by the present invention is to provide: a liquid crystal display, comprising: multiple data lines, multiple scanning lines, and multiple pixel units arranged as a matrix, wherein each pixel unit includes a first pixel and a second pixel, and the first pixel and the second pixel in each pixel unit is charged by a same corresponding data line; a first frequency division unit for receiving a first control signal, performing a frequency division to the first control signal in order to obtain a first clock signal; a second frequency division unit for receiving a second control signal, performing a frequency division to the second control signal in order to obtain a second clock signal; a gate-driver-on-array (GOA) unit for generating a scanning signal according to the first clock signal and the second clock signal; a control unit for receiving the first control signal and the second control signal, and when the scanning signal is effective, controlling a first pixel and a second pixel corresponding to the scanning signal to be charged in a time-division manner according to the first control signal and the second control signal; wherein, the first frequency division unit is a D (data) flip-flop, a clock terminal of the data flip-flop receives the first control signal, a first output terminal of the data flip-flop is connected with a data input terminal of the data flip-flop, a second output terminal of the data flip-flop outputs the first clock signal such that a frequency of the first clock is one half of a frequency of the first control signal; and wherein, the second frequency division unit includes a first inverter, a data flip-flop and a second inverter; an input terminal of the first inverter receives the second control signal; an output terminal of the first inverter is connected with a clock terminal of the data flip-flop; an first output terminal of the data flip-flop is connected with a data input terminal of the data flip-flop; a second output terminal of the data flip-flop is connected with an input terminal of the second inverter; an output terminal of the second inverter outputs the second clock signal such that a frequency of the second clock signal is one half of a frequency of the second control signal.

Wherein the control circuit includes multiple control units corresponding to the multiple data lines one by one; each control unit includes a first switching element and a second switching element; first terminals of the first switching element and the second switching element are respectively connected with the first pixel and the second pixel; second terminals of the first switching element and the second switching element are connected with a same corresponding data line after the second terminals are connected with each other; the third terminals of the first switching element and the second switching element correspondingly receive the first control signal and the second control signal; wherein, when the first control signal is effective, the first switching element is turned on such that the data line charges the first pixel; and when the second control signal is effective, the second switching element is turned on such that the data line charges the second pixel.

Wherein, the first switching element and the second switching element are NMOS transistors; the first terminal, the second terminal and the third terminal of each of the first switching element and the second switching element are respectively corresponding to a drain electrode, a source electrode and a gate electrode of the NMOS transistor.

Wherein, the GOA unit is used for generating a first scanning signal and a second scanning signal according to the first clock signal and the second clock signal, and outputting the first scanning signal and the second scanning signal respectively to the scanning line of a Nth stage and the scanning line of a (N+1)th stage, wherein N is a natural number, and the first scanning signal and the second scanning signal are effective in a time-division manner.

Wherein, the first control signal and the second control signal are identical in frequency and opposite in phase; the first clock signal and the second clock signal are identical in frequency and opposite in phase; a scanning period of each of the first scanning signal and the second scanning signal is a reciprocal of a frequency of the first control signal or the second control signal.

In order to solve above technology problem, another technology solution adopted by the present invention is: a liquid crystal display, comprising: multiple data lines, multiple scanning lines, and multiple pixel units arranged as a matrix, wherein each pixel unit includes a first pixel and a second pixel, and the first pixel and the second pixel in each pixel unit is charged by a same corresponding data line; a first frequency division unit for receiving a first control signal, performing a frequency division to the first control signal in order to obtain a first clock signal; a second frequency division unit for receiving a second control signal, performing a frequency division to the second control signal in order to obtain a second clock signal; a gate-driver-on-array (GOA) unit for generating a scanning signal according to the first clock signal and the second clock signal; and a control unit for receiving the first control signal and the second control signal, and when the scanning signal is effective, controlling a first pixel and a second pixel corresponding to the scanning signal to be charged in a time-division manner according to the first control signal and the second control signal.

Wherein, the first frequency division unit is a D (data) flip-flop, a clock terminal of the data flip-flop receives the first control signal, a first output terminal of the data flip-flop is connected with a data input terminal of the data flip-flop, a second output terminal of the data flip-flop outputs the first clock signal such that a frequency of the first clock is one half of a frequency of the first control signal.

Wherein, the second frequency division unit includes a first inverter, a data flip-flop and a second inverter; an input terminal of the first inverter receives the second control signal; an output terminal of the first inverter is connected with a clock terminal of the data flip-flop; an first output terminal of the data flip-flop is connected with a data input terminal of the data flip-flop; a second output terminal of the data flip-flop is connected with an input terminal of the second inverter; an output terminal of the second inverter outputs the second clock signal such that a frequency of the second clock signal is one half of a frequency of the second control signal.

Wherein, the control circuit includes multiple control units corresponding to the multiple data lines one by one; each control unit includes a first switching element and a second switching element; first terminals of the first switching element and the second switching element are respectively connected with the first pixel and the second pixel; second terminals of the first switching element and the second switching element are connected with a same corresponding data line after the second terminals are connected with each other; the third terminals of the first switching element and the second switching element correspondingly receive the first control signal and the second control signal; wherein, when the first control signal is effective, the first switching element is turned on such that the data line charges the first pixel; and when the second control signal is effective, the second switching element is turned on such that the data line charges the second pixel.

Wherein, the first switching element and the second switching element are NMOS transistors; the first terminal, the second terminal and the third terminal of each of the first switching element and the second switching element are respectively corresponding to a drain electrode, a source electrode and a gate electrode of the NMOS transistor.

Wherein, the GOA unit is used for generating a first scanning signal and a second scanning signal according to the first clock signal and the second clock signal, and outputting the first scanning signal and the second scanning signal respectively to the scanning line of a Nth stage and the scanning line of a (N+1)th stage, wherein N is a natural number, and the first scanning signal and the second scanning signal are effective in a time-division manner.

Wherein, the first control signal and the second control signal are identical in frequency and opposite in phase; the first clock signal and the second clock signal are identical in frequency and opposite in phase; a scanning period of each of the first scanning signal and the second scanning signal is a reciprocal of a frequency of the first control signal or the second control signal.

In order to solve the above technology problem, another technology solution adopted by the present invention is to provide: a control method for a liquid crystal display, wherein the liquid crystal display includes multiple data lines, multiple scanning lines, and multiple pixel units arranged as a matrix, wherein each pixel unit includes a first pixel and a second pixel, and the first pixel and the second pixel in each pixel unit is charged by a same corresponding data line, and the control method comprises: receiving a first control signal and performing a frequency division to the first control signal in order to obtain a first clock signal; receiving a second control signal, and performing a frequency division to the second control signal in order to obtain a second clock signal; generating a scanning signal according to the first clock signal and the second clock signal; and when the scanning signal is effective, the first control signal and the second control signal control a first pixel and a second pixel corresponding to the scanning signal to be charged in a time-division manner.

Wherein, in the step of generating a scanning signal according to the first clock signal and the second clock signal specifically is: generating a first scanning signal and a second scanning signal according to the first clock signal and the second clock signal, and outputting the first scanning signal and the second scanning signal respectively to the scanning line of a Nth stage and the scanning line of a (N+1)th stage, wherein N is a natural number, and the first scanning signal and the second scanning signal are effective in a time-division manner.

Wherein, the first control signal and the second control signal are identical in frequency and opposite in phase; the first clock signal and the second clock signal are identical in frequency and opposite in phase; a scanning period of each of the first scanning signal and the second scanning signal is a reciprocal of a frequency of the first control signal or the second control signal.

The beneficial effect of the present invention is: in the liquid crystal display and the control method for the same, through switching the first control signal and the second control signal, and performing a frequency division to the first control signal and the second control signal in order to obtain a corresponding first clock signal and a second clock signal. Then, controlling an output of the scanning line according to the first clock signal and the second clock signal. Through the above way, the liquid crystal display of the present invention can reduce the number of inputted signals, the time for adjusting a timing sequence of the inputted signals and improving the production efficiency.

DETAILED DESCRIPTION OF THE PREFERRED EMBODIMENT

In the embodiment and claims of the present invention, some vocabularies are used to indicate some specific elements. A person skilled in the art can understand that manufacturers may use a different vocabulary to indicate a same element. The present embodiment and claims do not use the difference in the vocabularies to distinguish the elements. The present embodiment and claims utilize the difference in the functions of the elements to distinguish the elements. The following content combines with the drawings and the embodiment for describing the present invention in detail.

Figure 1:
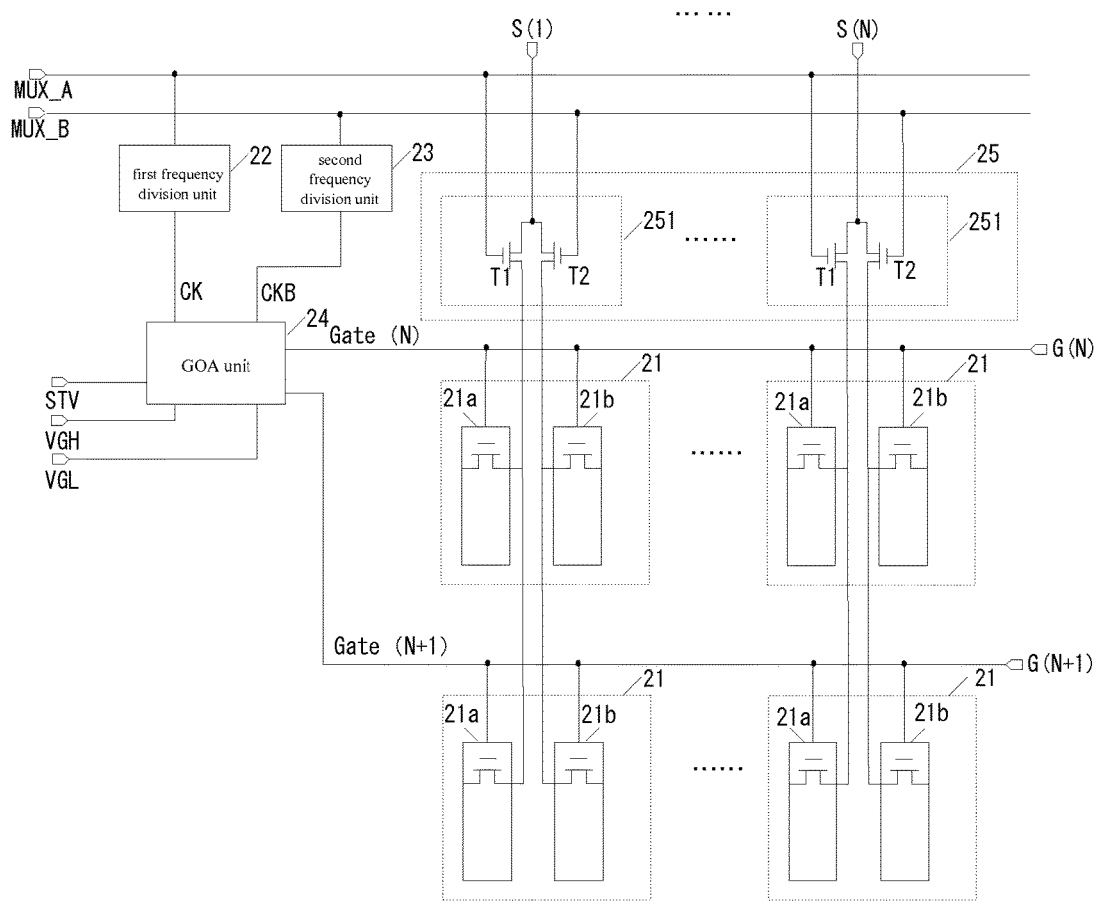
FIG. 1 is a schematic structure diagram of a liquid crystal display according to an embodiment of the present invention.

FIG. 1 is a schematic structure diagram of a liquid crystal display according to an embodiment of the present invention. As shown in FIG. 1, the liquid crystal display includes data lines S(N) (N is a natural number), scanning line G(N) (N is a natural number), multiple pixel units 21 arranged as a matrix, a first frequency division unit 22, a second frequency division unit 23, a gate-driver-on-array (GOA) unit 24 and a control unit 25.

Each pixel unit 21 is connected with a corresponding data line and a corresponding scanning line. Each pixel unit 21 includes a first pixel 21a and a second pixel 21b. The first pixel 21a and the second pixel 21b in each pixel unit 21 are charged by a same corresponding data line.

The first frequency division unit 22 is connected with the GOA unit 24, and used for receiving a first control signal MUX_A, and performing a frequency division to the first control signal MUX_A in order to obtain a first clock signal CK, and sending the first clock signal CK to the GOA unit 24.

Figure 2:
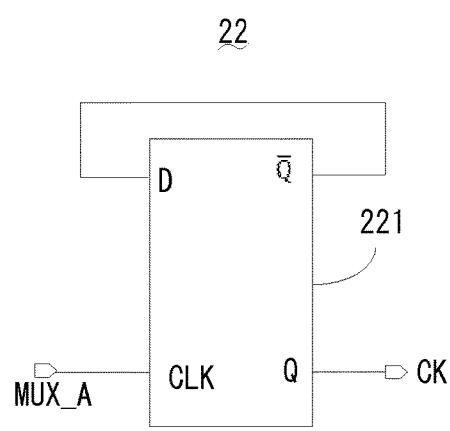
FIG. 2 is a circuit diagram of the first frequency division unit shown in FIG. 1.

With combined reference to FIG. 2, FIG. 2 is a circuit diagram of a first frequency division unit shown in FIG. 1. As shown in FIG. 2, the first frequency division unit 22 is a D (data) flip-flop 221.

A clock terminal CLK of the data flip-flop 221 receives the first control signal MUX_A. A first output terminal $\overline{Q}$ of the data flip-flop 221 is connected with a data input terminal D of the data flip-flop 221. A second output terminal Q of the data flip-flop 221 is connected with the GOA unit 24 in FIG. 1 for outputting the first clock signal CK to the GOA unit 24. Wherein, a frequency of the first clock CK is one half of a frequency of the first control signal MUX_A.

With reference to FIG. 1 again, the second frequency division unit 23 is connected with the GOA unit 24 for receiving a second control signal MUX_B, performing a frequency division to the second control signal MUX_B in order to obtain a second clock signal CKB, and sending the second clock signal CKB to the GOA unit 24.

Figure 3:
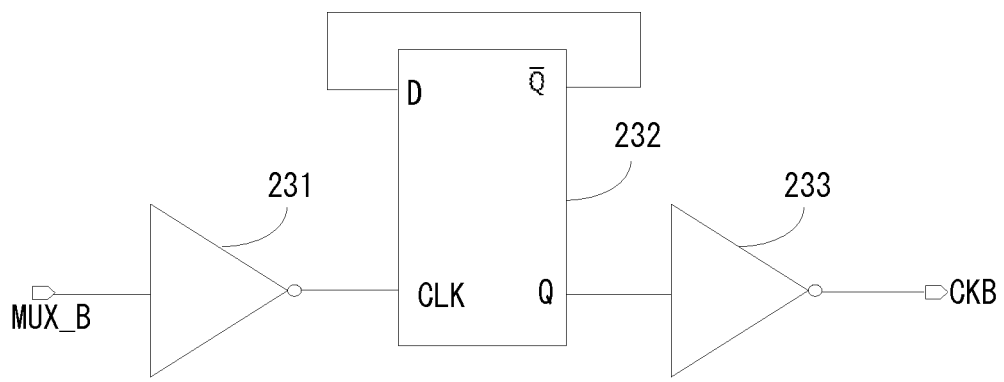
FIG. 3 is a circuit diagram of the second frequency division unit shown in FIG. 1.

With combined reference to FIG. 3, and FIG. 3 is a circuit diagram of the second frequency division unit shown in FIG. 1. As shown in FIG. 3, the second frequency division unit 23 includes a first inverter 231, a data flip-flop 232 and a second inverter 233.

An input terminal of the first inverter 231 receives the second control signal MUX_B. An output terminal of the first inverter 231 is connected with a clock terminal CLK of the data flip-flop 232. A first output terminal Q of the data flip-flop 232 is connected with a data input terminal D of the data flip-flop 232. A second output terminal Q of the data flip-flop 232 is connected with an input terminal of the second inverter 233. An output terminal of the second inverter 233 is connected with the GOA unit 24 in FIG. 1 for outputting the second clock signal CKB to the GOA unit 24. Wherein, a frequency of the second clock signal CKB is one half of a frequency of the second control signal MUX_B.

With reference to FIG. 1 again, the GOA unit 24 is used for generating a scanning signal according to the first clock signal CK and the second clock signal CKB. Specifically, the GOA unit 24 depends on the first clock signal CK, the second clock signal CKB and coordinates with a starting pulse signal STV, a high voltage source VGH and a low voltage source VGL to generate a first scanning signal Gate(N) and a second scanning signal G(N+1) and output the first scanning signal Gate(N) and the second scanning signal G(N+1) to a scanning line G(N) of a Nth stage and a scanning line G(N+1) to a (N+1)th stage. Wherein, the starting pulse signal STV is used for turning on a scanning action of the scanning line, the high voltage source VGH and the low voltage source VGL are inputted constant voltage control signals. The high voltage source VGH is a high voltage-level signal, and the low voltage source VGL is a low voltage-level signal. The both are used for providing a high voltage level and a low voltage level in the GOA unit 24.

In the present embodiment, the first control signal MUX_A and the second control signal MUX_B are identical in frequency and opposite in phase. Preferably, a duty ratio of the first control signal MUX_A to the second control signal MUX_B is 1:2. The first clock signal CK and the second clock signal CKB are identical in frequency and opposite in phase. Preferably, a duty ratio of the first clock signal CK to the second clock signal CKB is 1:2. A scanning period of each of the first scanning signal Gate(N) and the second scanning signal Gate(N+1) is a reciprocal of a frequency of the first control signal MUX_A or the second control signal MUX_B. The first scanning signal Gate(N) and the second scanning signal Gate(N+1) are effective in a time-division manner. That is, the first scanning signal Gate(N) and the second scanning signal Gate(N+1) are high voltage-level signals in a time-division manner.

With reference to FIG. 1, the control circuit 25 includes multiple control units 251 corresponding to the multiple data lines S(N) one by one. Each control unit 251 includes a first switching element T1 and a second switching element T2.

Preferably, the first switching element T1 and the second switching element T2 are NMOS transistors. A first terminal, a second terminal and a third terminal of each of the first switching element T1 and the second switching element T2 are respectively corresponding to a drain electrode, a source electrode and a gate electrode of the NMOS transistor.

The first terminals of the first switching element T1 and the second switching element T2 are respectively connected with the first pixel 21a and the second pixel 21b. The second terminals of the first switching element T1 and the second switching element T2 are connected with an identical corresponding data line after the second terminals are connected with each other. The third terminals of the first switching element T1 and the second switching element T2 correspondingly receive the first control signal MUX_A and the second control signal MUX_B.

Figure 4:
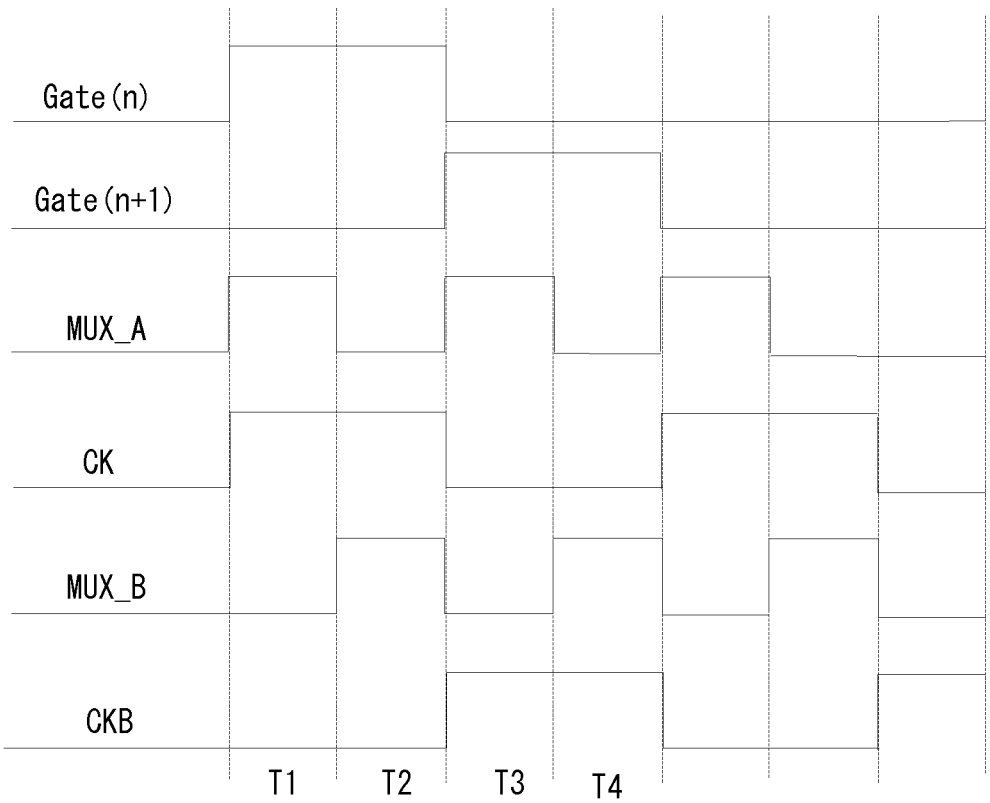
FIG. 4 is a timing diagram of the liquid crystal display shown in FIG. 1.

With also reference to FIG. 4, FIG. 4 is a timing diagram of the liquid crystal display shown in FIG. 1. As shown in FIG. 4:

In T1 period, the first control signal MUX_A is a high voltage-level signal, the second control signal MUX_B is a low voltage-level signal such that the first switching element T1 is turned on and the second switching element T2 is turned off. Therefore, the first scanning signal Gate(N) applied on the scanning line G(N) and outputted from the GOA unit 24 is at a high voltage level. The second scanning signal Gate(N+1) applied on the scanning line G(N+1) and outputted from the GOA unit 24 is at a low voltage level. At this time, the data line S(N) charges the first pixel 21a in the pixel unit 21 correspondingly connected with the scanning line G(N).

In T2 period, the first control signal MUX_A is a low voltage-level signal, the second control signal MUX_B is a high voltage-level signal such that the first switching element T1 is turned off and the second switching element T2 is turned on. The first scanning signal Gate(N) is maintained at a high voltage level, and the second scanning signal Gate(N+1) is maintained at a low voltage level. At this time, the data line S(N) charges the second pixel 21b in the pixel unit 21 correspondingly connected with the scanning line G(N).

In T3 period, the first control signal MUX_A is a high voltage-level signal, the second control signal MUX_B is a low voltage-level signal such that the first switching element T1 is turned on and the second switching element T2 is turned off. Therefore, the first scanning signal Gate(N) becomes a low voltage level from the high voltage level. The second scanning signal Gate(N+1) becomes a high voltage level from the low voltage level. At this time, the data line S(N) charges the first pixel 21a in the pixel unit 21 correspondingly connected with the scanning line G(N+1).

In T4 period, the first control signal MUX_A is a low voltage-level signal, the second control signal MUX_B is a high voltage-level signal such that the first switching element T1 is turned off and the second switching element T2 is turned on. The first scanning signal Gate(N) is maintained at a low voltage level, and the second scanning signal Gate(N+1) is maintained at a high voltage level. At this time, the data line S(N) charges the second pixel 21b in the pixel unit 21 correspondingly connected with the scanning line G(N+1).

In the sequentially scanning process of the multiple scanning lines G(N), repeating operations for the periods T1~T4, a charging for all pixel unit 21 in the liquid crystal display device is finished.

Figure 5:
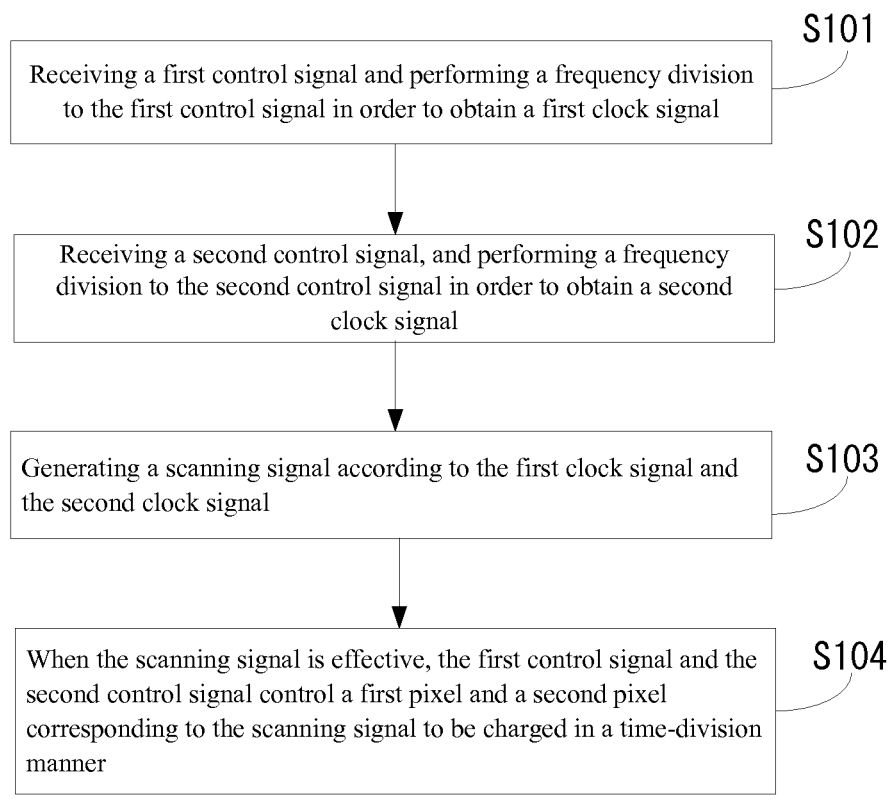
FIG. 5 is a flowchart of a control method for the liquid crystal display shown in FIG. 1.

FIG. 5 is a flowchart of a control method for the liquid crystal display shown in FIG. 1. As shown in FIG. 5, the control method includes following steps:

Step S101: receiving a first control signal and performing a frequency division to the first control signal in order to obtain a first clock signal.

In the step S101, the first frequency division unit 22 receives the first control signal MUX_A, and performing a frequency division to the first control signal MUX_A in order to obtain a first clock signal CK. Preferably, a frequency of the first clock signal CK is one half of a frequency of the first control signal MUX_A.

Step S102: receiving a second control signal, and performing a frequency division to the second control signal in order to obtain a second clock signal.

In the step S102, the second frequency division unit 23 receives the second control signal MUX_B, and performing a frequency division to the second control signal MUX_B in order to obtain a second clock signal CKB. Preferably, a frequency of the second clock signal CKB is one half of a frequency of the second control signal MUX_B.

Wherein, the first control signal MUX_A and the second control signal MUX_B are identical in frequency and opposite in phase. Preferably, a duty ratio of the first control signal MUX_A to the second control signal MUX_B is 1:2. The first clock signal CK and the second clock signal CKB are identical in frequency and opposite in phase. Preferably, a duty ratio of the first clock signal CK to the second clock signal CKB is 1:2.

Step S103: generating a scanning signal according to the first clock signal and the second clock signal.

In the step S103, the GOA unit 24 generates the scanning signal according to the first clock signal CK and the second clock signal CKB. Specifically, the GOA unit 24 depends on the first clock signal CK, the second clock signal CKB and coordinates with a starting pulse signal STV, a high voltage source VGH and a low voltage source VGL to generate a first scanning signal Gate(N) and a second scanning signal G(N+1) and correspondingly outputs to a scanning line G(N) of a Nth stage and a scanning line G(N+1) of a (N+1)th stage.

Wherein, the first scanning signal Gate(N) and the second scanning signal Gate(N+1) are effective in a time-division manner. That is, the first scanning signal Gate(N) and the second scanning signal Gate(N+1) are high voltage-level signals in a time-division manner. Preferably, a scanning period of each of the first scanning signal Gate(N) and the second scanning signal Gate(N+1) is a reciprocal of a frequency of the first control signal MUX_A or the second control signal MUX_B.

Step S104: when the scanning signal is effective, the first control signal and the second control signal control a first pixel and a second pixel corresponding to the scanning signal to be charged in a time-division manner.

In the step S104, when the first scanning signal Gate(N) is effective, that is, the first scanning signal Gate(N) is at a high voltage level.

If the first control signal MUX_A is a high voltage-level signal, and the second control signal MUX_B is a low voltage-level signal, the first switching element T1 is turned on and the second switching element T2 is turned off. The data line S(N) charges the first pixel 21a in the pixel unit 21 correspondingly connected with the scanning line G(N).

If the first control signal MUX_A is a low voltage-level signal, and the second control signal MUX_B is a high voltage-level signal such that the first switching element T1 is turned off and the second switching element T2 is turned on. The data line S(N) charges the second pixel 21b in the pixel unit 21 correspondingly connected with the scanning line G(N).

When the second scanning signal Gate(N+1) is effective, that is, the second scanning signal Gate(N+1) is a high voltage level:

If the first control signal MUX_A is a high voltage-level signal, the second control signal MUX_B is a low voltage-level signal such that the first switching element T1 is turned on and the second switching element T2 is turned off. The data line S(N) charges the first pixel 21a in the pixel unit 21 correspondingly connected with the scanning line G(N+1).

If the first control signal MUX_A is a low voltage-level signal, the second control signal MUX_B is a high voltage-level signal such that the first switching element T1 is turned off and the second switching element T2 is turned on. The data line S(N) charges the second pixel 21b in the pixel unit 21 correspondingly connected with the scanning line G(N+1).

The beneficial effect of the present invention is: in the liquid crystal display and the control method for the same, through switching the first control signal and the second control signal, and performing a frequency division to the first control signal and the second control signal in order to obtain a corresponding first clock signal and a second clock signal. Then, controlling an output of the scanning line according to the first clock signal and the second clock signal. Through the above way, the liquid crystal display of the present invention can reduce the number of inputted signals, the time for adjusting a timing sequence of the inputted signals and improving the production efficiency.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display, comprising:
multiple data lines, multiple scanning lines, and multiple pixel units arranged as a matrix, wherein each pixel unit includes a first pixel and a second pixel, and the first pixel and the second pixel in each pixel unit is charged by a same corresponding data line;
a first frequency division circuit for receiving a first control signal, performing a frequency division to the first control signal in order to obtain a first clock signal;
a second frequency division circuit for receiving a second control signal, performing a frequency division to the second control signal in order to obtain a second clock signal;
a gate-driver-on-array (GOA) circuit for generating a scanning signal according to the first clock signal and the second clock signal;
a control circuit for receiving the first control signal and the second control signal, and when the scanning signal is effective, controlling a first pixel and a second pixel corresponding to the scanning signal to be charged in a time-division manner according to the first control signal and the second control signal;
wherein, the first frequency division circuit is a D (data) flip-flop, a clock terminal of the data flip-flop receives the first control signal, a first output terminal of the data flip-flop is connected with a data input terminal of the data flip-flop, a second output terminal of the data flip-flop outputs the first clock signal such that a frequency of the first clock is one half of a frequency of the first control signal; and
wherein, the second frequency division circuit includes a first inverter, a data flip-flop and a second inverter; an input terminal of the first inverter receives the second control signal; an output terminal of the first inverter is connected with a clock terminal of the data flip-flop; an first output terminal of the data flip-flop is connected with a data input terminal of the data flip-flop; a second output terminal of the data flip-flop is connected with an input terminal of the second inverter; an output terminal of the second inverter outputs the second clock signal such that a frequency of the second clock signal is one half of a frequency of the second control signal;
wherein the control circuit includes multiple control units corresponding to the multiple data lines one by one; each control unit includes a first switching element and a second switching element; first terminals of the first switching element and the second switching element are respectively connected with the first pixel and the second pixel; second terminals of the first switching element and the second switching element are connected with a same corresponding data line after the second terminals are connected with each other; the third terminals of the first switching element and the second switching element correspondingly receive the first control signal and the second control signal;
wherein, when the first control signal is effective, the first switching element is turned on such that the data line charges the first pixel; and
when the second control signal is effective, the second switching element is turned on such that the data line charges the second pixel.

2. The liquid crystal display according to claim 1, wherein, the first switching element and the second switching element are NMOS transistors; the first terminal, the second terminal and the third terminal of each of the first switching element and the second switching element are respectively corresponding to a drain electrode, a source electrode and a gate electrode of the NMOS transistor.

3. The liquid crystal display according to claim 1, wherein, the GOA unit circuit is used for generating a first scanning signal and a second scanning signal according to the first clock signal and the second clock signal, and outputting the first scanning signal and the second scanning signal respectively to the scanning line of a Nth stage and the scanning line of a (N+1)th stage, wherein N is a natural number, and the first scanning signal and the second scanning signal are effective in a time-division manner.

4. The liquid crystal display according to claim 3, wherein, the first control signal and the second control signal are identical in frequency and opposite in phase; the first clock signal and the second clock signal are identical in frequency and opposite in phase; a scanning period of each of the first scanning signal and the second scanning signal is a reciprocal of a frequency of the first control signal or the second control signal.

5. A liquid crystal display, comprising:
multiple data lines, multiple scanning lines, and multiple pixel units arranged as a matrix, wherein each pixel unit includes a first pixel and a second pixel, and the first pixel and the second pixel in each pixel unit is charged by a same corresponding data line;
a first frequency division circuit for receiving a first control signal, performing a frequency division to the first control signal in order to obtain a first clock signal;
a second frequency division circuit for receiving a second control signal, performing a frequency division to the second control signal in order to obtain a second clock signal;
a gate-driver-on-array (GOA) circuit for generating a scanning signal according to the first clock signal and the second clock signal; and
a control circuit for receiving the first control signal and the second control signal, and when the scanning signal is effective, controlling a first pixel and a second pixel corresponding to the scanning signal to be charged in a time-division manner according to the first control signal and the second control signal;
wherein, the control circuit includes multiple control units corresponding to the multiple data lines one by one; each control unit includes a first switching element and a second switching element; first terminals of the first switching element and the second switching element are respectively connected with the first pixel and the second pixel; second terminals of the first switching element and the second switching element are connected with a same corresponding data line after the second terminals are connected with each other; the third terminals of the first switching element and the second switching element correspondingly receive the first control signal and the second control signal;
wherein, when the first control signal is effective, the first switching element is turned on such that the data line charges the first pixel; and
when the second control signal is effective, the second switching element is turned on such that the data line charges the second pixel.

6. The liquid crystal display according to claim 5, wherein, the first frequency division circuit is a D (data)

flip-flop, a clock terminal of the data flip-flop receives the first control signal, a first output terminal of the data flip-flop is connected with a data input terminal of the data flip-flop, a second output terminal of the data flip-flop outputs the first clock signal such that a frequency of the first clock is one half of a frequency of the first control signal.

7. The liquid crystal display according to claim 5, wherein, the second frequency division circuit includes a first inverter, a data flip-flop and a second inverter; an input terminal of the first inverter receives the second control signal; an output terminal of the first inverter is connected with a clock terminal of the data flip-flop; an first output terminal of the data flip-flop is connected with a data input terminal of the data flip-flop; a second output terminal of the data flip-flop is connected with an input terminal of the second inverter; an output terminal of the second inverter outputs the second clock signal such that a frequency of the second clock signal is one half of a frequency of the second control signal.

8. The liquid crystal display according to claim 5, wherein, the first switching element and the second switching element are NMOS transistors; the first terminal, the second terminal and the third terminal of each of the first switching element and the second switching element are respectively corresponding to a drain electrode, a source electrode and a gate electrode of the NMOS transistor.

9. The liquid crystal display according to claim 5, wherein, the GOA circuit is used for generating a first scanning signal and a second scanning signal according to the first clock signal and the second clock signal, and outputting the first scanning signal and the second scanning signal respectively to the scanning line of a Nth stage and the scanning line of a (N+1)th stage, wherein N is a natural number, and the first scanning signal and the second scanning signal are effective in a time-division manner.

10. The liquid crystal display according to claim 9, wherein, the first control signal and the second control signal are identical in frequency and opposite in phase; the first clock signal and the second clock signal are identical in frequency and opposite in phase; a scanning period of each of the first scanning signal and the second scanning signal is a reciprocal of a frequency of the first control signal or the second control signal.

* * * * *